United States Patent [19]
Ooishi

[11] Patent Number: 5,988,306
[45] Date of Patent: Nov. 23, 1999

[54] AUTOMATICALLY GUIDED VEHICLE

[75] Inventor: Kazunori Ooishi, Shizuoka, Japan

[73] Assignee: Yazaki Industrial Chemical Co., Ltd., Japan

[21] Appl. No.: 08/949,856

[22] Filed: Oct. 14, 1997

[51] Int. Cl.⁶ .................................................. B60T 7/16
[52] U.S. Cl. ........................................ 180/168; 180/24.02
[58] Field of Search .................................. 180/167, 168, 180/23, 24.02, 15; 901/1

[56] References Cited

U.S. PATENT DOCUMENTS

| | | | |
|---|---|---|---|
| 4,221,273 | 9/1980 | Finden | 180/23 |
| 4,307,329 | 12/1981 | Taylor | 180/168 |
| 4,345,662 | 8/1982 | Deplante | 180/168 |
| 4,379,497 | 4/1983 | Hainsworth et al. | 180/168 |
| 4,515,235 | 5/1985 | Yamamoto et al. | 180/168 |
| 4,529,052 | 7/1985 | Imai et al. | 180/23 |
| 5,233,526 | 8/1993 | Detriche et al. | 180/167 |
| 5,267,173 | 11/1993 | Tanizawa et al. | 180/168 |
| 5,293,955 | 3/1994 | Lee | 180/169 |

FOREIGN PATENT DOCUMENTS

| | | | |
|---|---|---|---|
| 0001504 | 4/1979 | European Pat. Off. | 180/168 |
| 2810576 | 9/1979 | Germany | 180/168 |
| 62-31524 | 2/1987 | Japan | 180/23 |
| 62-8429 | 2/1987 | Japan . | |
| 63-297165 | 12/1988 | Japan | 180/168 |
| 3103716 | 5/1995 | Japan . | |

*Primary Examiner*—Lanna Mai
*Assistant Examiner*—Michael Cuff
*Attorney, Agent, or Firm*—Rader, Fishman & Grauer; Ronald P. Kananen

[57] ABSTRACT

An automatically guided vehicle that runs guided by guide signals transmitted from guiding material laid on the floor. The wheels at the four corners of the chassis of the vehicle are casters that can be switched over between free and fixed modes. A steering drive unit which can move by itself in longitudinal direction is mounted on the lower surface of the chassis at approximately the center thereof. Sensors that detect guide signals are provided at the front and rear parts of the steering drive unit. The steering drive unit changes its operating position automatically as the vehicle switches over between forward and backward running modes. The casters change modes in such a manner that, as the automatically guided vehicle switches over between forward and backward running modes, the casters at the front function as free wheels while the casters at the rear function as fixed or pivot-restrained wheels.

5 Claims, 9 Drawing Sheets

AUTOMATICALLY GUIDED VEHICLE

BACKGROUND OF THE INVENTION

This invention relates to an automatically guided vehicle which can carry various types of loads along a guide path consisting of guiding materials such as magnetic tape laid in a factory or a warehouse.

Various kinds of automatically guided vehicles which carry loads along preset guide paths in unmanned operation have been invented and put into practice both domestically and abroad. The present applicant has also developed magnetically guided vehicles and provided them for practical use as disclosed in the registered Japan's Utility Model No.3013716 and the Japan's Patent Application No.8-196618.

Figure 9:
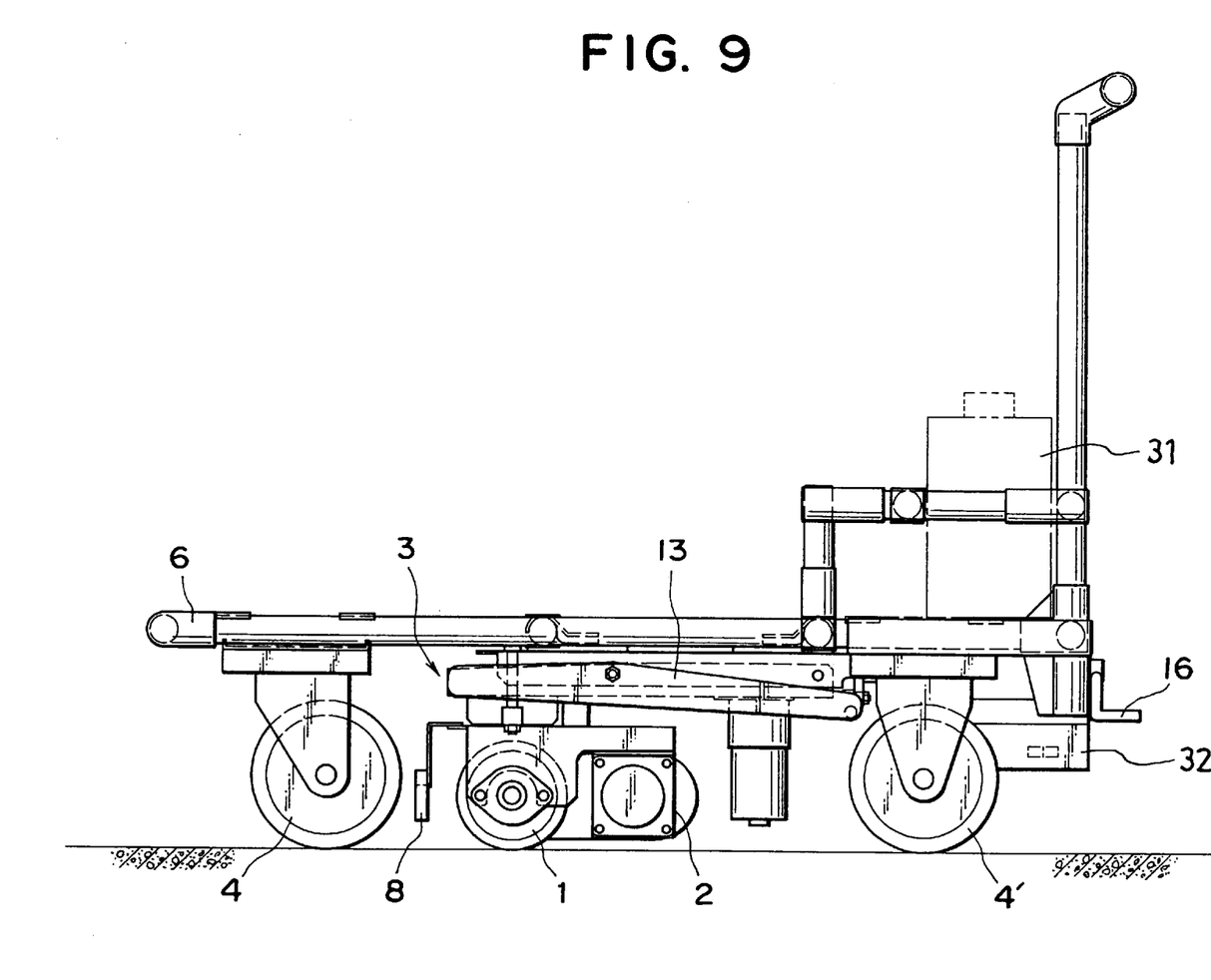
FIG. 9 is a front view showing an example of the conventional art.

The magnetically guided vehicle according to the registered utility model No.3013716 cited above has, as shown in FIG. 9, a magnetically guided steering drive unit 3 mounted detachably on the lower surface of the chassis 6 at a position slightly toward the front (near the front wheels 4). This magnetically guided steering drive unit 3 has a magnetic sensor 8 located in front that detects magnetism (magnetic force lines) emitted from the magnetic tape of the guide path, and the drive unit 3 mounted is comprised of a driving wheel 1, a driving motor 2 that drives the driving wheel and an automatic steering device for the driving wheel 1. At the four corners of the lower surface of the chassis 6 wheels 4,4' are attached. The front wheels 4 are universal casters which provide good maneuverability and the rear wheels 4' are direction-fixed. In the rear portion of the chassis 6a battery 31 is mounted, and a control device 32 which governs mainly the automatic control of the magnetically guided steering drive unit 3 is mounted on the lower surface of the magnetically guided steering drive unit 3.

Figure 10:
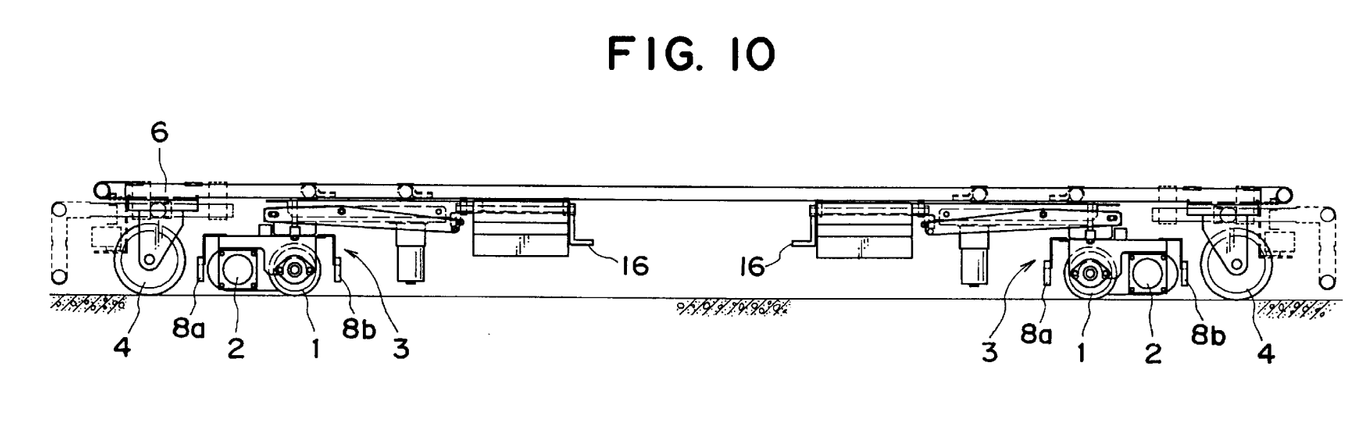
FIG. 10 is a front view showing another example of the conventional art.

The magnetically guided vehicle according to the application cited above has, as shown in FIG. 10, two magnetically guided steering drive units 3,3, detachably attached to the lower surface of the chassis 6 in an approximately symmetric arrangement, one of which is attached toward the front (near the front wheels) of the chassis 6 and the other which is attached toward the rear (near the rear wheels) of the chassis 6. The two magnetically guided steering drive units 3,3 each have at the front and rear portions magnetic sensors 8a, 8b to detect magnetism (magnetic force lines) emitted from magnetic tape of the guide path. The structure and function of the two magnetically guided steering drive units 3,3 are the same as those described in the cited registered utility model No.3013716. However, with this magnetically guided vehicle, two magnetically guided steering drive units 3,3 are always used for forward and backward running, the guide path being detected by whichever magnetic sensor is positioned in the front with respect to the running direction. For this purpose, universal casters are employed for all of the four wheels at the corners of the lower surface of the chassis 6.

Since the magnetically guided vehicle according to the registered utility model No.3013716 patent cited above (FIG. 9) is so constructed as to be driven and steered by the driving wheels 1 positioned toward the front of the chassis 6, it is practically impossible to steer the vehicle for backward running solely by means of the driving wheels 1 because of the unfavorable relationship among the direction of the driving force exerted by the driving wheels 1, the position of the center of gravity of the vehicle and the direction of running resistance force. The use of this magnetically guided vehicle must, therefore, be limited to cases in which the vehicle runs in one determined direction on a closed-loop path; it cannot be used for running on a complex path that requires the reversing of running direction.

The magnetically guided vehicle according to the application cited above (FIG. 10) allows for both forward and backward running using two magnetically guided steering drive units 3,3. Owing to the two magnetically guided steering drive units 3,3, the vehicle can be driven and steered forcibly in both the forward and backward directions in a perfectly identical manner by detecting the guide path by means of the sensor that is positioned in the front with respect to the running direction, within a certain width without fishtailing. There is, therefore, no problem in using this vehicle on a complex path that requires a combination of forward and backward running modes.

The magnetically guided vehicle of FIG. 10, using two magnetically guided steering drive units 3,3, requires fabrication costs more than twice those for a single magnetically guided steering drive unit. Moreover, the control device for using two magnetically guided steering drive units 3,3 and for synchronized driving inevitably becomes complex. Further, for mounting two magnetically guided steering drive units 3,3, a longer chassis is needed which results in an increased size of the vehicle itself. Still further, even though a control means may be introduced to minimize the trajectory difference between the front and rear wheels, it is inevitable that the minimum width of space needed for running of the vehicle at corners of the path increases, which makes employing the vehicle in a narrow space problematic.

It is the primary object of the invention, therefore, to provide an improved automatically guided vehicle which, while equipped with a single steering drive unit, can run not only in the forward direction but also in the backward direction without any inconvenience.

SUMMARY OF THE INVENTION

The automatically guided vehicle according to the present invention has a steering drive unit attached on the lower surface of the chassis equipped with wheels attached at least to the four corners of the vehicle and runs on a path guided by signals transmitted from guiding material laid along the path on the floor.

The wheels at the four corners of the chassis are casters which can be freely switched between free and fixed modes. A steering drive unit is detachably mounted approximately at the center of the lower surface of the chassis in such a manner as to allow it to move by itself in the direction of running. Sensors that detect signals from guiding material are provided on the front and rear sides of the steering drive. The steering drive unit runs forward by itself in direction in which the vehicle is moving so as to change the driving position when the running direction of the vehicle is changed. The casters also change modes from one to the other so at the time of switching so that the forward wheels in the running direction are made to function as free casters and the rear wheels are made to function as fixed wheels.

Changeover plates which move toward or away from the casters provided at the four corners of the vehicle are provided on a slide base that moves integrally with the steering drive unit. On each of the casters a lock plate is attached that restrains or releases pivoting motion of the caster by making use of the approaching or receding action of the switching plate with respect to the casters.

On the lower surface of the chassis of the vehicle, magnets are attached at the front and rear positions where the steering drive unit is to be fixed. When the direction of the vehicle is reversed, the magnetism of the magnet positioned in the rear side in terms of the new direction of the vehicle is cut off and the steering drive unit is fixed in the new driving position by the magnetic force of the front magnet.

A mechanism is provided to switch the driving wheel of the steering drive unit between a mode wherein the wheel is in contact with the floor and a mode wherein the wheel is suspended from the floor.

With the automatically guided vehicle of the present invention, the single steering drive unit moves by itself at the start of operation toward the front of the vehicle in terms of the direction of advance to a position where the driving wheel of the vehicle is in front of the horizontal position of the center of gravity of the vehicle so that the driving wheel always exerts a pulling force on the vehicle. Since the operation is identical for forward and backward running, the vehicle can be used not only for operations in one direction on a closed-loop path, but for repeated forward and backward operations or for operations consisting of a complex combination of forward and backward running modes without any inconvenience. Hence there is no need for a closed-loop guide path, contributing to a highly versatile cargo handling.

Moreover, since only one steering drive unit is used, fabrication costs can be minimized, the vehicle can be designed with a minimum necessary longitudinal dimension, and the control device can be of simple construction. The width of the guide path needed for running of the vehicle can also be minimized.

DETAILED DESCRIPTION

Figure 1:
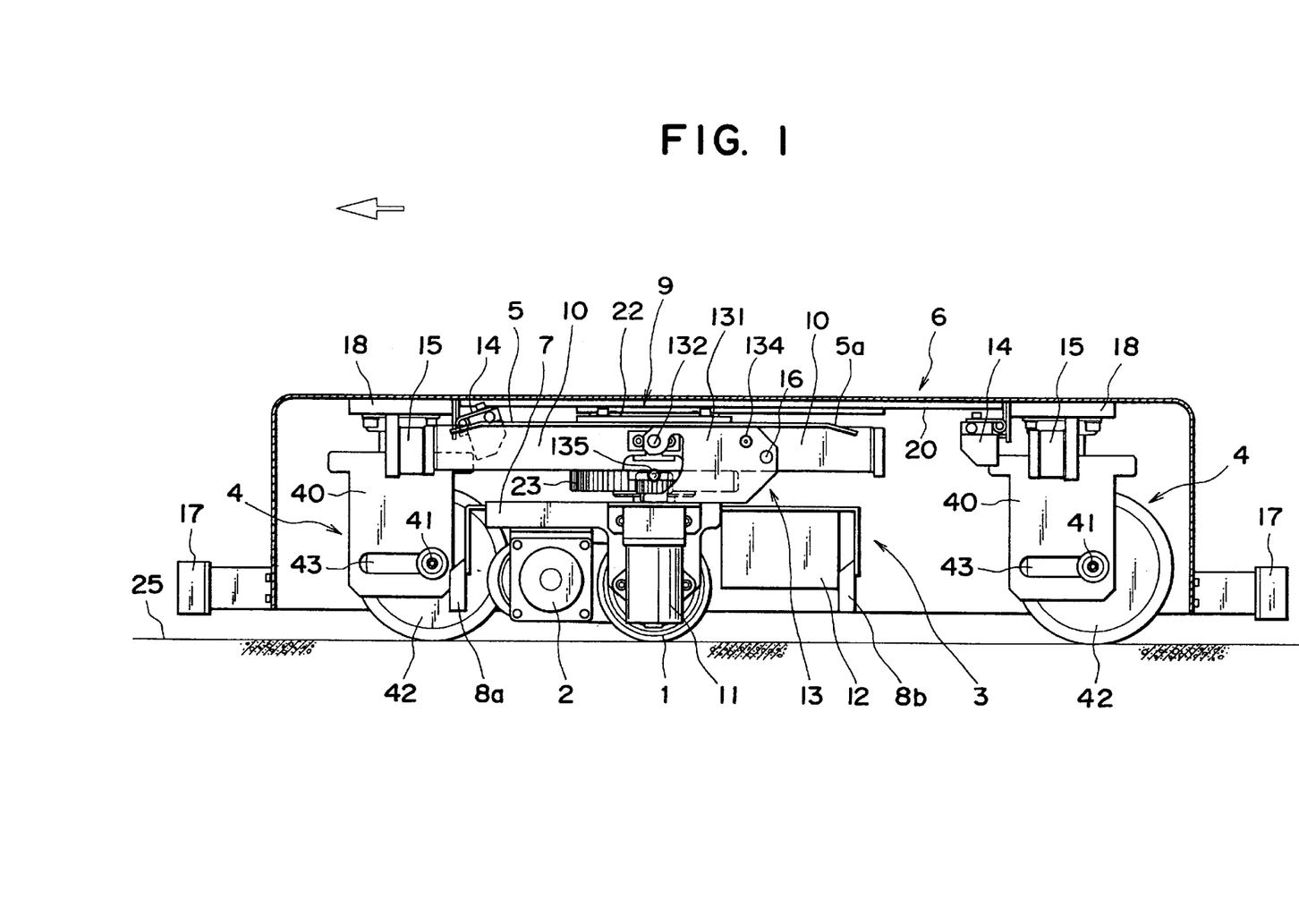
FIG. 1 is a front view showing an automatically guided vehicle according to the present invention moving to the left.
Figure 2:
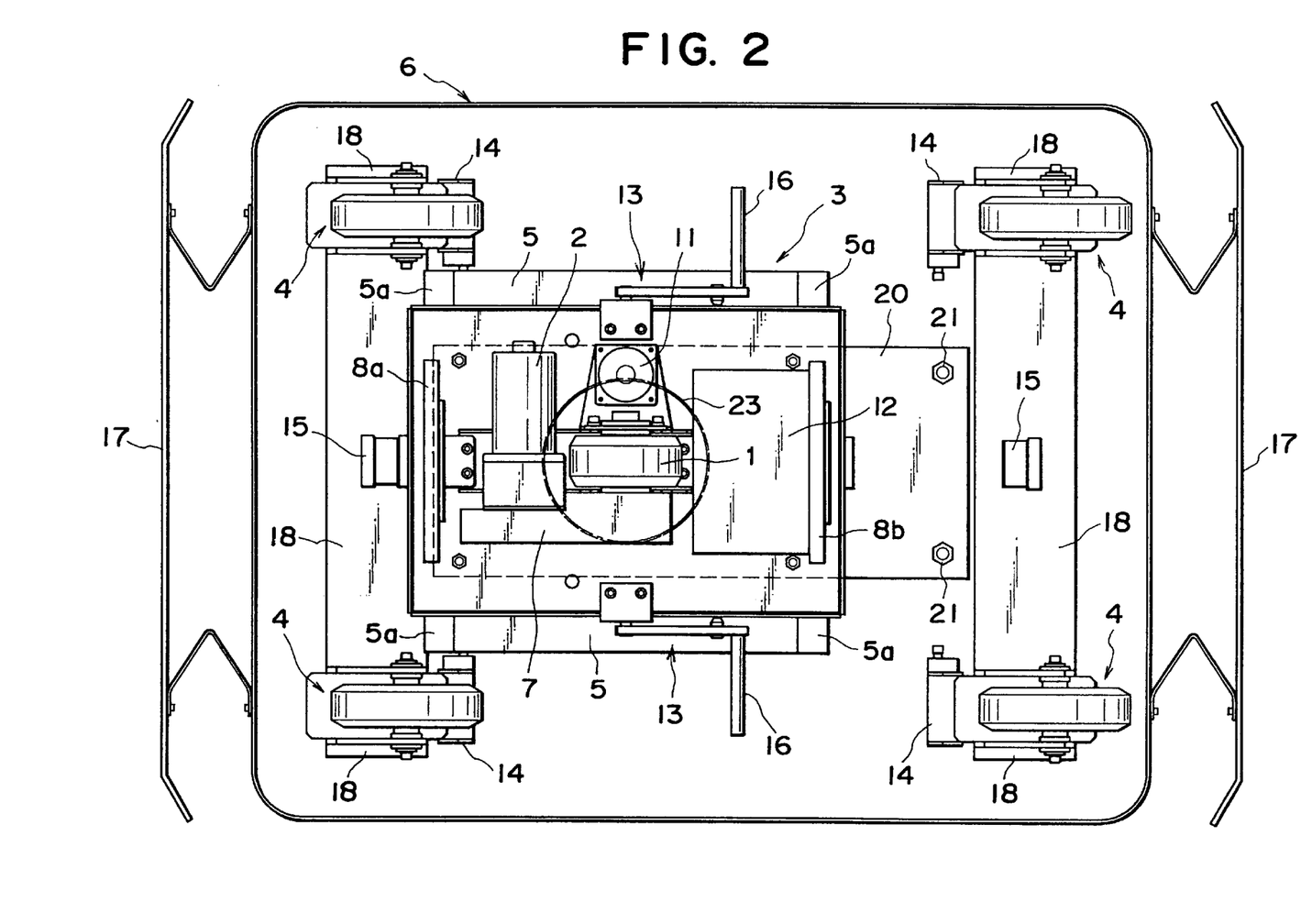
FIG. 2 is a bottom view of an automatically guided vehicle according to the present invention.

The automatically guided vehicle according to the present invention, as shown with the upper structure removed in FIG. 1 and 2, has casters 4 that can be switched freely between free and fixed modes provided on the lower surface of a chassis 6 of the vehicle. Although the chassis 6 shown in FIG. 1 and 2 is drawn as a flat structure, in reality, chassis with frame structures assembled by connecting pipes with connectors as shown in FIG. 9 are commonly used. Each of the universal casters 4, as shown in detail in FIGS. 4 and 5, utilizes a caster function by a vertical axle 44 attached pivotably to an attachment plate 18 fixed to the lower surface of the chassis 6 by means of a bearing 45.

Figure 4:
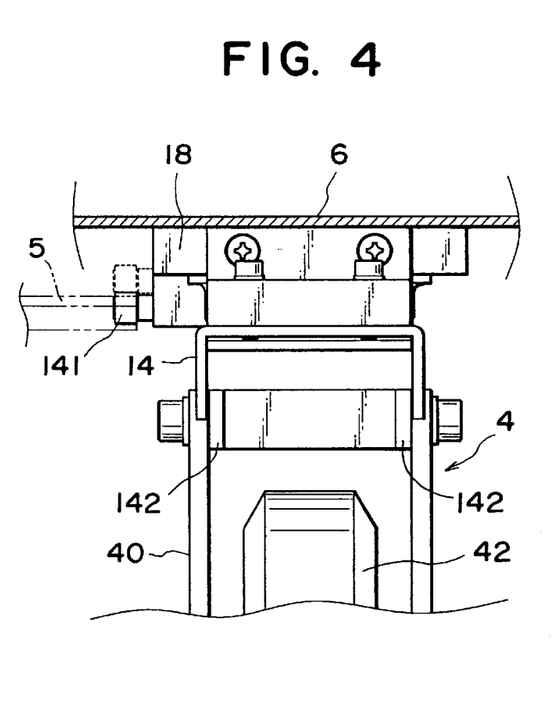
FIG. 4 is an illustration of a mechanism according to the present invention for switching over between the free and fixed modes of the casters.
Figure 5:
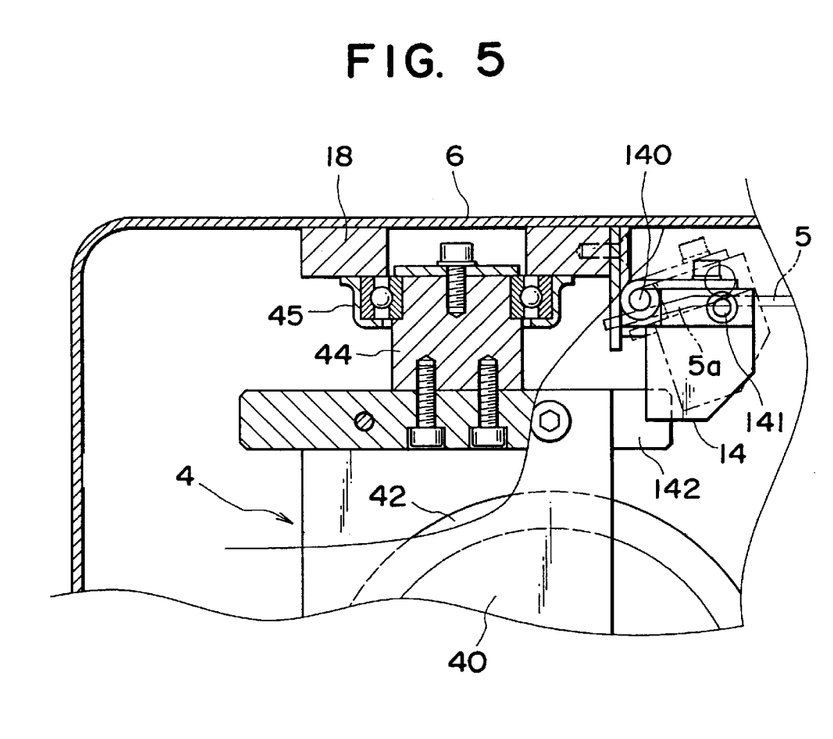
FIG. 5 is another illustration of a mechanism according to the present invention for switching over between the free and fixed modes of the casters.

On the side surface of the attachment plate 18, or more particularly, on the inner side surface seen in FIG. 2, a lock plate 14 is provided that is free of vertical turning by means of hinge 140 for the purpose of making the caster 4 function as a fixed or pivot-restrained wheel. The lock plate 14 has a Π shape as seen in FIG. 4. On the same side of the attachment plate 18 a protrusion 143 is provided that fits inside the Π shape of the lock plate. As shown in FIG. 4 and 5 in solid lines, as the lock plate 14 turns downward due to the weight (or by the spring action of a torsion coil not shown in the figures) to the horizontal position and the protrusion 142 fits inside the Π shape of the lock plate 14, horizontal rotation of a bracket 40 of the universal caster 4 is restrained and the caster is thereby made to function as a fixed wheel. Conversely, as the lock plate 14 turns upward to the position designated by the broken line and the restraint of the protrusion 142 is released, the wheel functions as a universal caster.

At approximately the center of the lower surface of the chassis 6 a steering drive unit 3 is detachably attached via a unit attachment plate 20 (FIG. 2). The unit attachment plate 20 is detachably attached to the lower surface of the chassis 6 by means of a plurality of bolts 21 as shown in FIG. 2. The steering drive unit 3 is mounted on the lower surface of the chassis 6 via a slide mechanism 9 (FIG. 7) so as to be able to move on its own (with respect to the chassis) in the direction the automatically guided vehicle is moving. The construction and function of this steering drive unit is practically the same as those disclosed in the patent application No.8-196618 referred to in BACKGROUND OF THE INVENTION; the steering drive unit comprises a driving wheel 1, a reversible motor 2 that provides the driving force to the driving wheel, and an automatic steering mechanism including a motor 11 for steering the driving wheel.

The slide mechanism 9 is of a well known structure as disclosed, for example, in Japan's Utility Model Publication No.S62-8429; a plurality of balls are located between a pair of orbit members and move in a circular fashion. More particularly, in FIG. 7, a plurality of balls 9d are located along a line between a slide rail 9a fixed to the lower surface of the unit attachment plate 20 with bolts 9c and sliders 9b that move sliding along the slide rail 9a. The lower sliders 9b are each fixed to attachment plates 19 and the pair of attachment plates 19,19 on the right and left sides are attached to a common plate 22 which is in turn fixed to the upper surface of the slide base 10.

A sun gear 23 for steering is fixed on the lower surface of the slide base 10 (FIG. 1, FIG. 3, FIG. 6), and, under a vertical axle (not shown) positioned at the center of the sun gear 23, a holder base 7 for the driving wheel 1 is rotatably supported. The motor for running 2 is provided on the lower surface of the holder base 7. A steering gear 24 of the motor for steering 11 attached on a side the holder base 7 engages with the sun gear 23 to constitute an automatic steering system. Magnetic sensors 8a, 8b are provided on the front and rear ends of the holder base 7 respectively. The sensor, 8a or 8b detects magnetism as guide signals from magnetic tape (not shown) laid along the guide path. For this guide system to operate, a control device 12 is attached on a part of the holder base 7. Besides above-mentioned magnetic tape, electric wire, any magnetic substance, optical guide tape, etc., which can transmit magnetic or optical guide signals, may be used as guiding material and laid on the floor.

Figure 3:
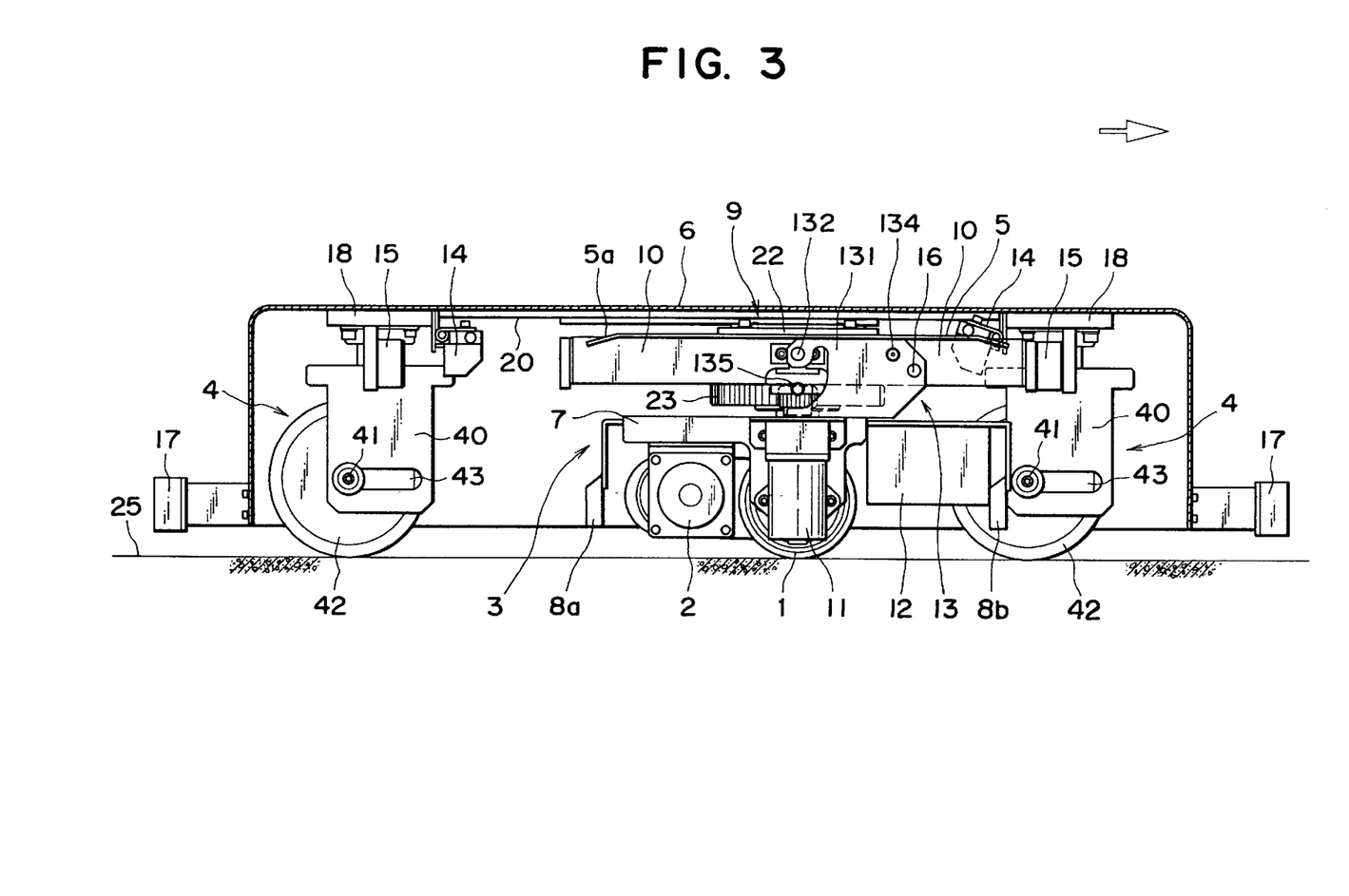
FIG. 3 is a front view showing an automatically guided vehicle according to the present invention moving to the right.

The construction being such as described above, as the driving wheel 1 is given driving force to rotate in the direction of either forward or backward running through depression of the start button, by the thrust force exerted thereby, the steering drive unit 3 together with the slide base 10 below the slide mechanism 9 first moves by itself, as shown in FIG. 1 and 3, relative to the chassis 6 which remains unmoved, to the position where the driving wheel 1 is at the front of the vehicle in terms of the running direction, which completes the operating conditions for pulling.

Making use of displacement of the slide base 10 effected by the initial self movement of the steering drive unit 3, the wheels at the four corners of the chassis change modes in such a way that the front wheels become free casters which are suited for steering and the rear wheels become fixed wheels which have a high running stability. To realize this switch-over, switch-over plates 5 are attached to the slide base 10. As seen from a comparison of FIG. 1 and 3, each of the switch-over plates 5 is so formed as to have a length sufficient for the front and rear ends to reach a cam follower 141 of the lock plate 14 attached to each universal caster 4 within the stroke allowed for the steering drive unit 3 and the slide base 10. Further, on the front and rear ends of the switch-over plate 5, a slope 5a is formed with the angle necessary to push up the lock plate 14 through the cam follower 141 to a height where the lock plate 14 is completely disengaged from the protrusion 142 of the bracket 40 as shown in FIG. 5.

Figure 6:
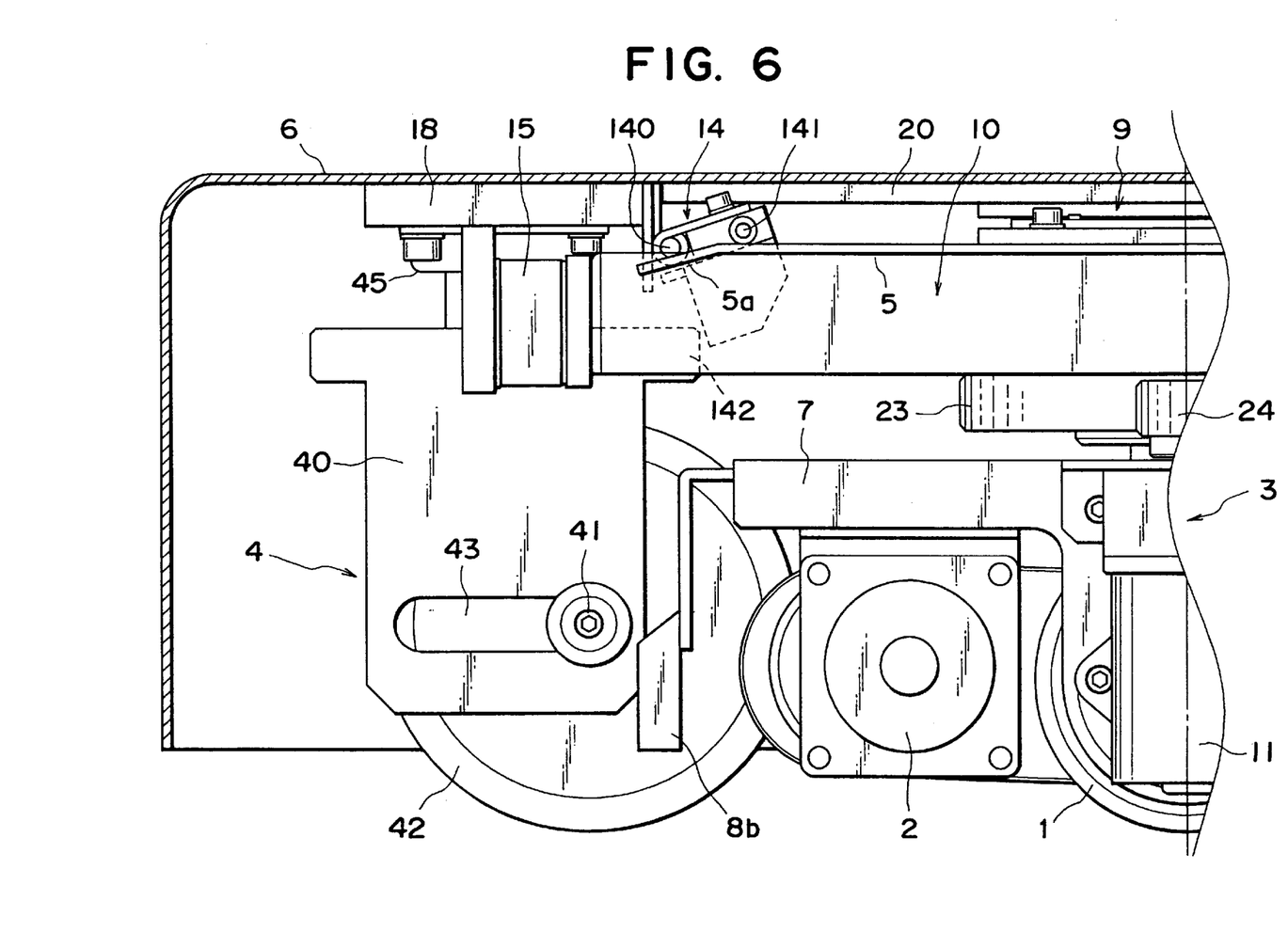
FIG. 6 is still another illustration of a mechanism according to the present invention for switching over between the free and fixed modes of the casters.

Therefore, the universal casters 4 at the front, toward which the switch-over plates 5 move along with the movement of the steering drive unit 3 at the start of operation, as shown in FIG. 5 and 6, are switched over to function as free wheels as each of the lock plates 14 is disengaged from the protrusion 142 through rotation caused by the slope 5a via the cam follower 141. At the same time, the casters 4 from which the switch-over plates 5 recede are made to function as fixed wheels as each of the lock plates 14 is released from the restraint effected by the switch-over plate 5 and turns downward by its own weight to restrain the protrusion 142.

As a means to fix the operating condition described above, magnets 15,15 are fixed on the lower surface of the chassis 6 at the point (arrest position) to which the front or rear end of the slide base 10 reaches after the switch-over plate 5 has completed the switch-over action against the lock plate 14 (FIG. 2). Namely, at the starting or restarting of the automatically guided vehicle, if there is a switch of operation modes between forward and backward running, the motor for running 2 the steering drive unit 3 is started and the rotation of the driving wheel 1 causes the movement of the steering drive unit 3. At the same time, through the switching operation, the magnetism of the magnet 15 which has been in contact with the slide base 10 which is a part of the steering drive unit 3 is cut off to make it easy for the slide base 10 to recede from the magnet 15. The steering drive unit 3 continues to move on its own until the slide base 10 touches the other magnet 15 positioned in front. The magnetic force couples again the steering drive unit 3 and the chassis 6 firmly enough to stand exterior forces and vibrations to a certain degree of intensity, and then begins running operation of the automatically guided vehicle. For this reason, the slide bases 10 are made of an excellent magnetic substance. FIG. 1 and 3 show the change of positions of the steering drive unit 3 accompanying the switching of the direction of the vehicle.

As the slide base 10 comes into contact with the magnet 15 along with the movement of the steering drive unit 3, the slope 5a of the switch-over plate 5 attached to the slide base 10, as shown in FIG. 5, moves under the cam follower 141 of the lock plate 14 of the universal caster 4 toward which the slide base 10 moves, and thereby turns the lock plate 14 upward until the lock plate 14 is completely disengaged from the protrusion 142. As a result of this, the casters 4 that serve as the front wheels of the vehicle are made to function as free wheels which are easy to steer by the driving wheel 1. Conversely, the casters 4 that serve as the rear wheels, are restrained in horizontal turning and are made to function as fixed or pivot-restrained wheels as the slide bases 10 move forward and the lock plates 14 turn downward by their own weight to restrain the protrusions 142, which prevents unstable fishtailing of the vehicle during operation.

Considering the fact that the casters 4 are switched over between free wheel mode and fixed wheel mode simultaneously with switching over between forward and backward running modes of the vehicle, each of the casters 4 is, as shown in detail in FIG. 6, so constructed that an axle hole 43 of the bracket 40 is formed as an oblong hole elongated in the longitudinal direction with its center at the vertical pivot axis and the axle 41 of the wheel 42 can move within the axle hole 43. As a result of this, with the switch of directions and the initial movement of the vehicle, the axle 41 slides into the axle hole 43 to the rearmost point in terms of the running direction where the wheel 42 settles (see the difference between FIG. 1 and 3). Consequently, especially with the casters 4 that are functioning as free wheels, the axle 41 of each of the wheels 42 is positioned behind the pivoting center of the wheel, which results in a sharp response for steering.

Figure 7:
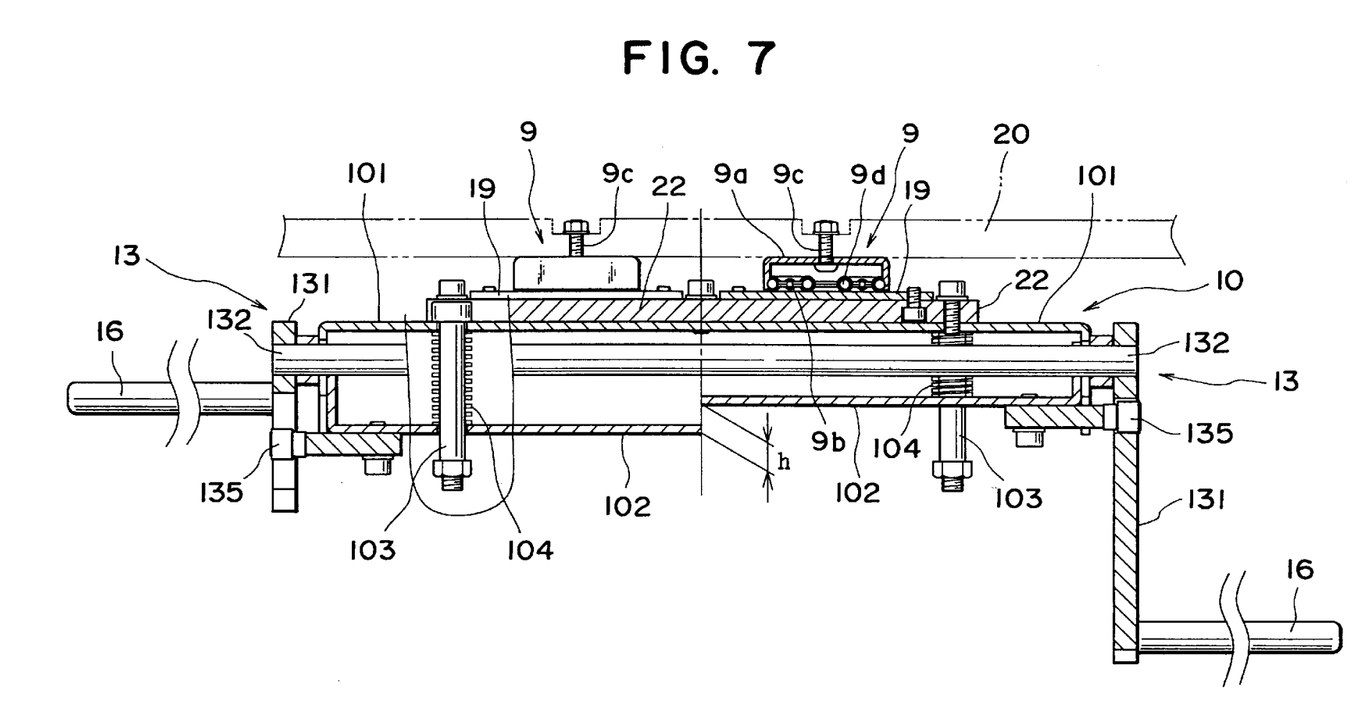
FIG. 7 is an illustration of a slide mechanism and a switchover mechanism according to the present invention.

Next, construction of a mechanism 13 which switches the driving wheel 1 of the steering drive unit 3 between a mode in which the wheel is in touch with the floor for running and a mode in which the wheel is suspended from the path shall be described with reference mainly to FIG. 7 and 8. The mechanism 13 is important in that the mechanism makes it easy to move the vehicle off the path by hand in order to charge the battery mounted on the vehicle or to repair mechanical or electrical problems with the guide path.

The mechanism 13 presupposes that the slide base 10 is of a flat box shape and comprises an upper case 101 and a lower case 102 that fit vertically together. The cases 101 and 102 can move relative to each other vertically along a plurality of guide pins 103. On each of the guide pins 103 a compression spring 104 is provided, both ends of which push against the upper and the lower cases 101 and 102 respectively. Both cases 101 and 102 are, therefore, always subject to spring force and as a result, the lower case 102 is forced downward. The lower part of the mechanism 9 described above is fixed on the upper surface of the upper case 101 through the common plate 22 and the sun gear 23 used by the steering drive unit 3 for steering is fixed on the lower surface of the lower case 102. The vertical pivot axle (not shown) and the steering drive unit 3 are mounted on the lower surface of the lower case 102.

As shown in FIG. 1 and 3, a support axle 132 is provided on a line that is perpendicular to the axis P (FIG. 8) of the vertical pivot axle (not shown) and that passes through both sides of the upper case 101 of the slide base 10. On both the right and left side of the slide base 10 the upper angle position of the base of a flat cam plate 131 having a cam profile 133 shown in FIG. 8 is mounted rotatably on the support axle 132. The pair of cam plates 131 on both sides are connected together in a symmetric position through the support axle 132. On the lower surface of the lower case 102 and under the support axle 132 a cam follower 135 protrudes to cause interference within the range where the cam profile 133 moves in a turning motion about the support axle 132. A manual handle 16 that rotates the pair of cam plates 131,131 in an identical motion is provided symmetrically at the free end of each of the cam plates 131 to extend horizontally.

Figure 8:
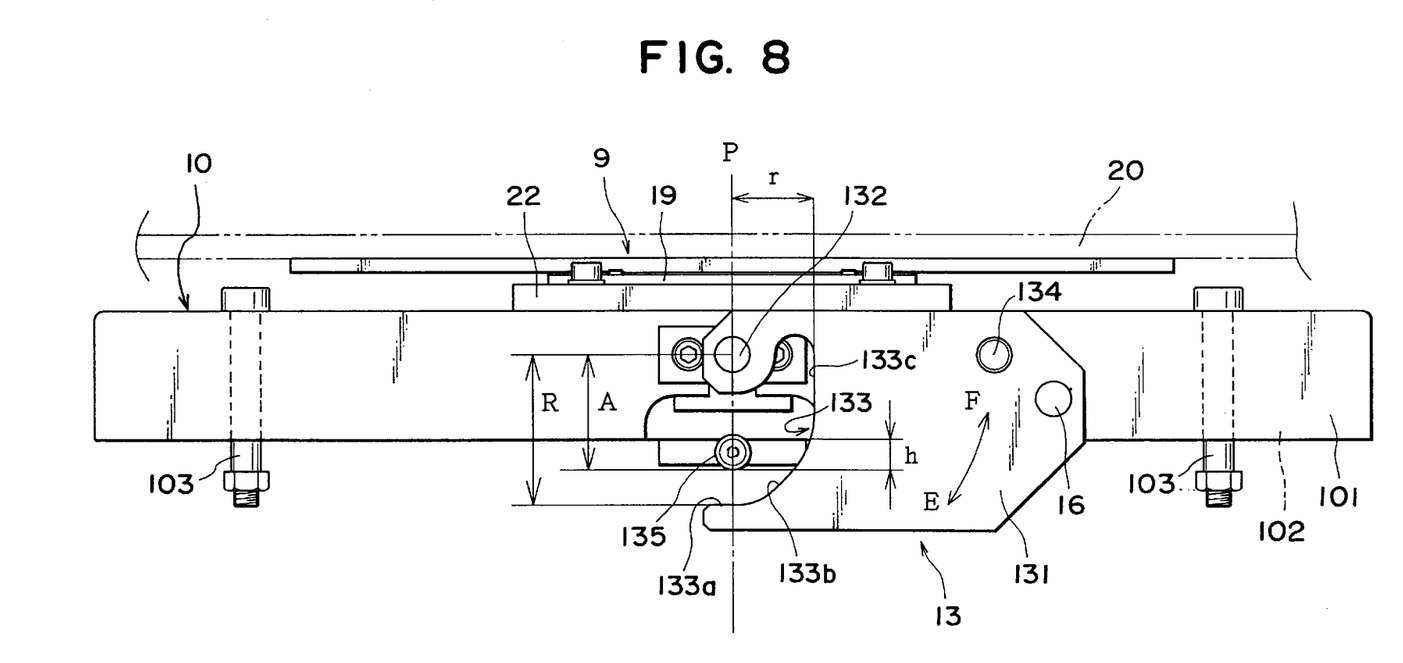
FIG. 8 is another illustration of a switchover mechanism according to the present invention.

As shown in FIG. 8, when the support axle 132 and the cam follower 135 are located separately along the vertical center axis P described above and the driving wheel 1 is in the position to be in contact with the floor and to exert a pulling force, the cam profile 133, the edge cut out of the cam plate 131 and processed, will have a straight-line part 133a based on the radius R which, from the center of the support axle 132, is sufficiently long enough to be greater than an A measurement described above, when A is equal to the distance from the center of the support axle 132 to the lower end of the cam follower 135. Further, the cam profile 133 is to be cut and processed in such a way as to have a circular part 133b and a straight-line part, (a tangential line part), which is based on the radius r, where the circular part 133b is to be cut and processed so that the height distance h, which signifies the rise of the driving wheel 1 from a position touching the floor 25 to a position in which it is spinning completely freely off the ground, can be changed in turn as the circular part 133b changes its radius based on from the above-described distance A to the distance equal to the radius r with a counterclockwise rotation of approximately 90° of the turning range of the cam plate 131 in FIG. 8.

If an operator turns either of the manual handles 16 from the position shown in FIG. 8 downward in a clockwise direction designated by E, the cam plate 131 rotates about the support axle 132. In this process, first the circular part 133b of the cam profile 133 contacts the lower surface of the cam follower 136 and, as the rotation of the cam plate proceeds, the lifted quantity of the cam follower 135 increases. As the cam plate 131 turns approximately 90° and the straight part 133c corresponding to the radius r comes in touch with the cam follower 135, the cam follower 135 attains the scheduled upward stroke h. At that position, without reversing the process, a stable supporting condition is effected under an equilibrium of force, that is, the driving wheel 1 of the steering drive unit 3 attached to the lower case 102 together with the cam follower 135 is lifted by h to be completely off the floor and idle. Hence, with out magnetic resistance of the motor 2 that acts on the driving wheel 1 and mechanical resistance in the transmission mechanism and others, the vehicle can be easily moved to a destination off the path using the casters at the four corners.

Conversely, when the vehicle is moved onto the guide path by an operator, and guided running operation is about to begin, the operator turns the manual handle 16 upward in a counterclockwise direction. The cam follower 135 descends according to the variation of the cam profile 133, and after turning approximately 90°, returns to the condition shown in FIG. 8 wherein the driving wheel 1 touches the floor and the vehicle is ready for running. To maintain this condition, the cam plate 131 is fixed at the position shown in FIG. 8 with a positioning bolt means 134.

The numeral 137 in the Figures designates bumpers attached to the front and rear ends of the vehicle.

What is claimed is:

1. An automatically guided vehicle which, having a steering drive unit mounted on a lower surface of a chassis which is equipped with no less than four wheels each at the four corners thereof, runs on a path being guided by guide signals transmitted by guiding material laid along the path;

said wheels at the four corners of the chassis are casters that can be switched between free and fixed modes;

a single steering drive unit is detachably mounted on the lower surface of said chassis at approximately the center of said chassis and can move by itself in the direction said vehicle is moving;

sensors to detect said guide signals transmitted from said guiding material are provided at the front and rear part of said steering drive unit;

said steering drive unit moves by itself toward the direction in which said vehicle is moving to change operation position thereof when switching between forward and backward running occurs; and said casters change said modes wherein said front casters function as free wheels and said rear casters function as fixed wheels when switching between forward and backward running occurs.

2. The automatically guided vehicle according to claim 1 having switch-over plates which, provided on a slide base that moves integrally with said steering drive unit, move toward or away from said casters on said four corners of the chassis, each of said casters having a lock plate that restrains or releases pivoting thereof making use of approaching and receding motion of said switch-over plates.

3. The automatically guided vehicle according to claim 1 or 2 wherein on said lower surface of said chassis magnets are attached at front and rear positions where said steering drive unit is held;

said magnets being constructed in such a manner that, as switching between forward and backward running occurs, said magnets at the rear side are released from magnetism while said magnets at the front side exert force to hold said steering drive unit at an operating position therefor.

4. The automatically guided vehicle according to claim 1 or 2 having a mechanism to switch over said driving wheel between a condition wherein said driving wheel touches the floor and a condition wherein said driving wheel is suspended off the floor.

5. The automatically guided vehicle according to claim 3 having a mechanism to switch over said driving wheel between a condition wherein said driving wheel touches the floor and a condition wherein said driving wheel is suspended off the floor.

* * * * *